Patented Mar. 31, 1942

UNITED STATES PATENT OFFICE 2,278,368

CONDENSATION PRODUCT CONTAINING SULPHUR

Walter Frost, Saarau, Kreis Schweidnitz, Schlesien, Germany, assignor to the firm Silesia Verein Chemischer Fabriken, Saarau, Kreis Schweidnitz, Germany No Drawing. Application February 1, 1939, Serial No. 253,995. In Germany March 26, 1938

6 Claims. (Cl. 260—79)

This invention relates to condensation products containing sulphur and it has particular relation to plastic condensation products which are obtained by causing polysulphides to react with organic compounds capable of reacting at least at two linkages with polysulphides.

It is known in the art that rubber-like condensation products of high molecular weight may be obtained by causing polysulphides of alkaline metals, alkaline-earth metals or ammonium to react with organic compounds having at two linkages negative residues which may be replaced by sulphide or polysulphide groups or are capable of taking up sulphur atoms. Such organic compounds are, for instance, dihalogenated hydrocarbons, dihalogenated ethers or esters, alkyldithio-sulphuric acids, alkyl dimercaptans, or aldehydes, particularly formaldehyde.

Many of the condensation products thus obtained show a rubber-like character. They are, as is known, distinguished by a marked resistance towards organic liquids such as gasoline, benzene and similar hydrocarbons, which dissolve rubber or cause it to swell, the degree of said resistance being dependent on the condensation grade of the condensation products. However, whereas these condensation products are superior to rubber in this respect, they leave much to be desired in comparison with rubber insofar as the mechanical properties of the articles made of said condensation products, such as strength, elasticity and softness, are concerned. The improvement of the mechanical properties of the polysulphide condensation products is, therefore, desirable and any success in this respect represents an advance in favor of the use of synthetic products instead of natural rubber.

I have discovered that the mechanical properties of high molecular rubber-like polysulphide condensation products obtained from the above mentioned raw materials can be improved by carrying out the condensation in the presence of organic compounds which are capable of reacting with polysulphides at more than two linkages.

Such compounds are, for instance, polyhalogenated hydrocarbons, such as penta-brompentane, higher chlorinated or brominated benzine, chlorinated or brominated rubber, polyvinyl chloride.

Furthermore, polyhalogenated ethers, esters, acetals, alcohols, hydroaromatic or mixed aromatic hydrocarbons having more than two halogen atoms in side chains may be used and also organic compounds containing instead of halogens, other groups which are capable of reacting with inorganic polysulphide groups at more than two linkages of the molecule, for instance hydrocarbons which are substituted by several thiosulphuric acid or mercaptan groups.

I have found that even small additions of, for instance, 0.1–1.0 part by weight of such negative polysubstituted compounds to 100 parts by weight of an organic compound, which has negative substitutions at two linkages, are capable of causing an essential improvement of the properties of the condensation product obtained.

According to my invention, the condensation with polysulphides may be carried out in a known manner in aqueous solution, with or without the addition of other solvents and in the presence or absence of dispersing agents and protective colloids. The products obtained, which may be washed out if desired, may be rolled into sheets, and may further be worked up and vulcanized in their native state or, in a manner known per se, with the addition of softening agents, zinc oxide, rubber and filling materials.

*Example 1.*—10 kilograms of ethylene chloride, to which 0.1% by weight of bromoparaffin has been added, are caused to react in a manner known per se with an aqueous solution containing 17.4 kilograms of sodium tetrasulphide and having a specific gravity of 1.3, in the presence of 0.6 kilogram of freshly precipitated magnesium hydroxide. Bromoparaffin can be prepared from paraffin oil and a twelve-fold amount of bromine in the presence of iron.

The suspension obtained is washed out with water and coagulated with hydrochloric acid, and can be rolled to sheets which show a considerably increased strength and elasticity in comparison with a product obtained without the addition of bromoparaffin from the same components in a similar manner.

*Example 2.*—10 kilograms of ethylene chloride, which contains in solution 1% by weight of choloparaffin, is caused to react in a manner known per se with 17.4 kilograms of sodium tetrasulphide in the presence of magnesium hydroxide. The suspension obtained is washed out and coagulated with hydrochloric acid. The coagulated product shows, when used in the mixture described below, an essential improvement of the mechanical properties in comparison with a product obtained without the addition of chloroparaffin under similar working conditions.

*Example 3.*—A product obtained in the presence of magnesium hydroxide from 10 kilograms of ethylene chloride, to which 2% by weight of penta-brompentane have been added, and 17.4 kilograms of sodium tetrasulphide, by causing these components to react in a known manner, washing out the suspension obtained with water and coagulating it with acid, yields when worked up with the components described below a mixture which shows an increase of strength of about 35% in comparison with a product prepared without the addition of penta-brompentane under similar working conditions.

*Example 4.*—230 parts by weight of ethylene chloride containing in solution 5% of rubber, are treated with 1.6 parts of bromine. To the product obtained 230 parts by weight of ethylene chloride are added and the mixture is caused to react in a known manner in the presence of magnesium hydroxide with an aqueous solution containing 820 parts by weight of sodium tetrasulphide. The product obtained by washing out and then coagulating the suspension obtained also shows improved mechanical properties.

*Example 5.*—10 kilograms of ethylene chloride containing in solution 1% by weight of polyvinyl chloride are reacted with an aqueous solution of 17.4 kilograms of sodium tetrasulphide in the presence of magnesium hydroxide. The resulting suspension is washed out with water and then coagulated by slightly acidifying with hydrochloric acid. Subsequently the product is separated by filtration dried and rolled into sheets. The mixture obtained as follows shows an increase of strength of about 37% as compared with a product prepared without the addition of polyvinyl chloride.

I have prepared mixtures from the condensation products obtained in accordance with the above Examples 1 to 5, and from a condensation product prepared under similar working conditions from ethylene chloride without any admixture, by mixing the following ingredients with said condensation products:

| | Parts by weight |
|---|---|
| The condensation product | 100 |
| Diphenyl guanidine | 0.25 |
| Mercapto-benzothiazole | 0.25 |
| Smoked sheets | 20.00 |
| Zinc oxide | 10.00 |
| Elastic soot | 5.00 |
| Sulphur | 0.75 |
| Stearic acid | 0.5 |
| Paraffin | 0.5 |

The products obtained from these mixtures by heating them to 140° for 30 minutes showed the following characteristics:

| Mixture containing the condensation product prepared— | Strength | Elongation | Hardness shore degrees |
|---|---|---|---|
| | $Kg./cm.^2$ | Per cent | |
| According to Ex. 1 | 81.6 | 590 | 62 |
| According to Ex. 2 | 79.9 | 653 | 62 |
| According to Ex. 3 | 81.2 | 553 | 60 |
| According to Ex. 4 | 67.8 | 497 | 67 |
| According to Ex. 5 | 87.3 | 750 | 62 |
| From ethylene chloride without any addition | 60.2 | 665 | 64 |

I claim:

1. A process of producing a condensation product containing sulfur which comprises a reaction between the solution of a polysulfide selected from the group consisting of the polysulfides of alkaline metals, alkaline-earth metals, and ammonium, and ethylene chloride, and the carrying out of said reaction in the presence of 0.1 to 5.0% of bromoparaffin.

2. A process of producing a condensation product containing sulfur which comprises a reaction between the solution of a polysulfide selected from the group consisting of the polysulfides of alkaline metals, alkaline-earth metals, and ammonium, and ethylene chloride, and the carrying out of said reaction in the presence of 0.1 to 5.0% of chloroparaffin.

3. An organic polysulfide plastic produced by the action of a polysulfide selected from the group consisting of the polysulfides of alkaline metals, alkaline-earth metals, and ammonium, on ethylene chloride, in the presence of 0.1 to 5.0% of bromoparaffin, said organic polysulfide plastic showing a high strength and high resistance towards organic solvents.

4. An organic polysulfide plastic produced by the action of a polysulfide selected from the group consisting of the polysulfides of alkaline metals, alkaline-earth metals, and ammonium, on ethylene chloride, in the presence of 0.1 to 5.0% of chloroparaffin, said organic polysulfide plastic showing a high strength and high resistance towards organic solvents.

5. A process of producing a condensation product containing sulfur, which comprises reacting a solution of a polysulfide selected from the group consisting of the polysulfides of alkaline metals, alkaline earth metals, and ammonium, and ethylene chloride, and carrying out the reaction in the presence of 0.1 to 5.0% of a halogenated compound containing more than two halogen atoms capable of reacting with said polysulfides, and selected from the group consisting of bromoparaffin, chloroparaffin and pentabrompentane.

6. An organic polysulfide plastic produced by the action of a polysulfide selected from the group consisting of the polysulfides of alkaline metals, alkaline earth metals, and ammonium, on ethylene chloride, in the presence of 0.1 to 5.0% of halogenated compound containing more than two halogen atoms capable of reacting with said polysulfides, and selected from the group consisting of bromoparaffin, chloroparaffin and pentabrompentane, said organic polysulfide plastic showing a high strength and high resistance toward organic solvents.

WALTER FROST.